No. 735,774.

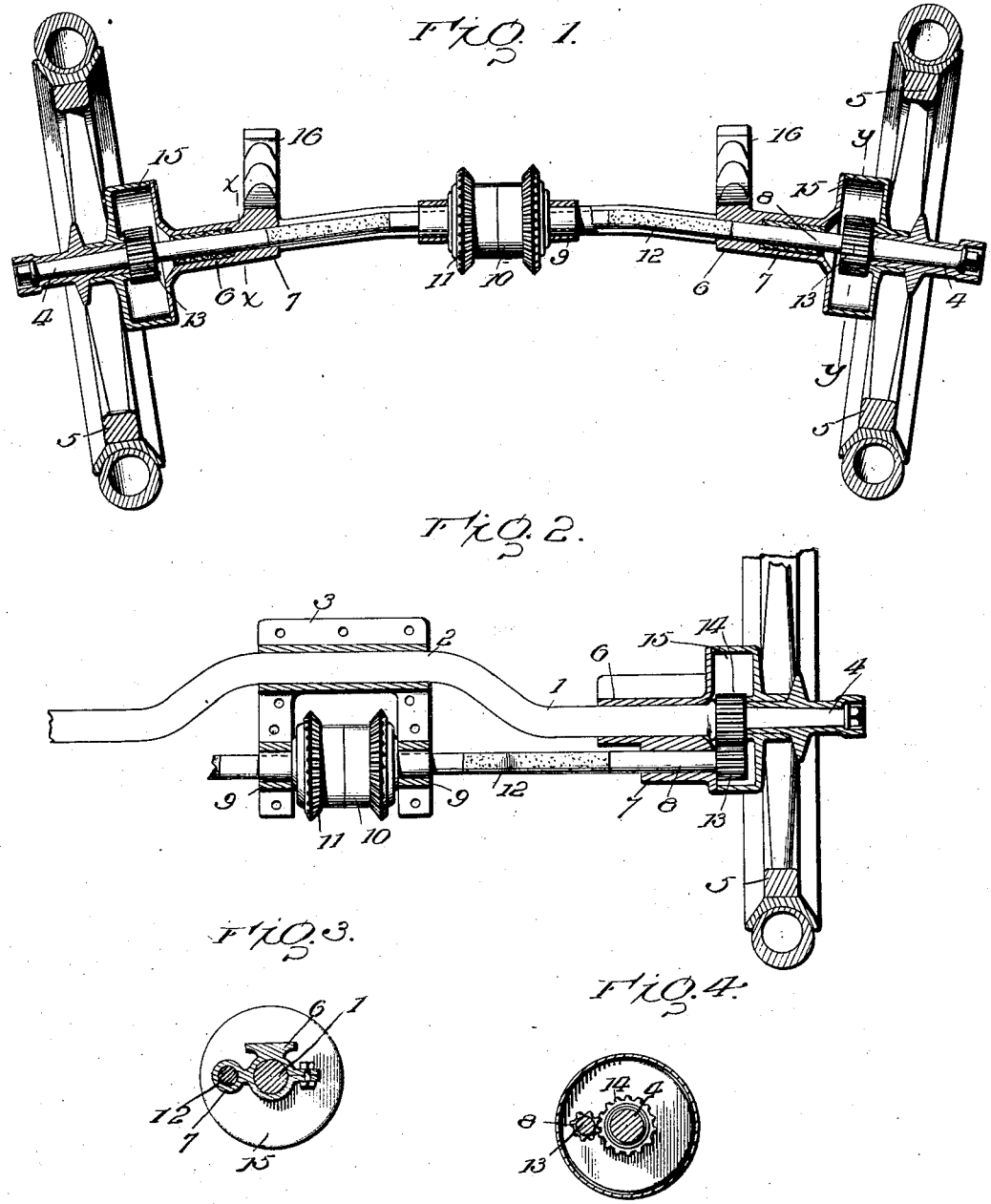

Patented August 11, 1903.

UNITED STATES PATENT OFFICE.

KIRK G. JOHNSTON, OF PIQUA, OHIO.

DRIVING-GEAR FOR AUTOMOBILES.

SPECIFICATION forming part of Letters Patent No. 735,774, dated August 11, 1903.

Application filed December 10, 1902. Serial No. 134,681. (No model.)

*To all whom it may concern:*

Be it known that I, KIRK G. JOHNSTON, a citizen of the United States, residing at Piqua, in the county of Miami and State of Ohio, have invented certain new and useful Improvements in Driving-Gear for Automobiles, of which the following is a specification.

This invention relates to novel gearing designed chiefly for mechanically-propelled vehicles or automobiles, although adapted for machines of every type constructed to be propelled over the ground in any manner and having opposite wheels connected by interposed gearing, whereby both are positively driven at the same or different rates of speed, according as the machine is traveling straight or in curved lines.

This invention provides a rigid solid axle for the wheels to carry the load and admit of the wheels receiving the proper gather, thereby relieving the drive-gearing of the load strain.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a front view of a pair of drive-wheels, axle therefor, and the gearing connecting the said drive-wheels, parts being in section. Fig. 2 is a top plan view of one-half of the axle and the adjunctive parts, a portion of the drive-wheel being broken away and parts being in section. Fig. 3 is a section substantially on the line X X of Fig. 1. Fig. 4 is a section on the line Y Y of Fig. 1.

Corresponding and like parts are referred to in the following description and indicated in all the views of the drawings by the same reference characters.

The axle 1 is solid and rigid throughout its length and is provided intermediate of its ends with an offset portion 2, upon which is firmly and rigidly mounted a bracket 3. The spindles or axle-arms 4 incline downward toward their outer ends to give the proper gather to the wheels 5, as indicated in Fig. 1. Brackets 6 are rigidly secured to the end portions of the axle inside the spindles and are provided with bearings 7, in which are journaled the outer ends of shafts 8. The inner ends of said shafts are provided with a differential gear 10, which is mounted in the bearings 9 of the bracket 3, said differential being driven by any suitable gearing, as sprocket and chain or by bevel-gear 11, as shown and preferred.

The driving-shaft 8 is provided with a flexible portion 12 between the bearings 7 and 9, thereby admitting of the shaft approximating the outline of the axle, as shown most clearly in Fig. 1. The outer end of each shaft 8 is geared to the wheel 5, so as to cause both to rotate positively, the gearing being of any type. As shown, a spur-gear 13 is secured to the outer end of the shaft 8 and meshes with a spur-gear 14, secured to the hub of the drive-wheel 5. A housing 15 is secured to the hub of the drive-wheel and incloses the gearing 13 and 14 and may be utilized as a brake-wheel. The brackets 6 receive the supporting spring or springs 16.

From the foregoing it will be understood that the load is supported directly by means of the axle and the ground-wheels, the gearing connecting the drive-wheels being free from the weight and the strain incident thereto and serving solely to positively connect the drive-wheels substantially in the manner stated. The flexible portions 12 in the length of the shafts 8 admit of direct engagement of the gear elements without bending strain, thereby reducing the friction to a minimum, which is highly important in mechanism of the character aforesaid.

Having thus described the invention, what is claimed as new is—

1. In drive-gear of the character described, and in combination with a rigid axle provided with inclined spindles, and drive-wheels mounted directly upon said spindles, brackets rigidly applied to the axle near its ends independent of the drive-wheels and intermediate of said ends, drive-shafts journaled in said brackets and having a flexible portion intermediate of the bearings, differential gearing connecting the inner ends of said shafts, and gearing connecting the outer ends of the shafts with the drive-wheels, substantially as specified.

2. In driving-gear of the character described, the combination with the rigid axle having inclined spindles, and drive-shafts connected at their inner ends by differential gearing, drive-wheels mounted upon the said spindles and geared to the outer ends of the drive-shafts, and a housing secured to each drive-wheel and inclosing the gearing, substantially as set forth.

3. In driving-gear of the character described, the combination of a rigid axle having its spindle-arms inclined and its middle portion offset, brackets firmly attached to the axle near and intermediate of its ends, drive-shafts journaled in said brackets and connected at their inner ends by means of differential gearing and having the portion intermediate of the bearings flexible, drive-wheels mounted upon the spindle-arms, and gearing connecting the drive-wheels with the outer ends of the respective drive-shafts, substantially as set forth.

In testimony whereof I affix my signature in presence of two witnesses.

KIRK G. JOHNSTON. [L. S.]

Witnesses:
F. E. KITZMILLER,
R. A. FORSYTH.